No. 626,195. Patented May 30, 1899.
D. C. SUI.
MACHINE FOR AND PROCESS OF SPINNING.
(Application filed June 18, 1897. Renewed Oct. 8, 1898.)
(No Model.) 3 Sheets—Sheet 1.
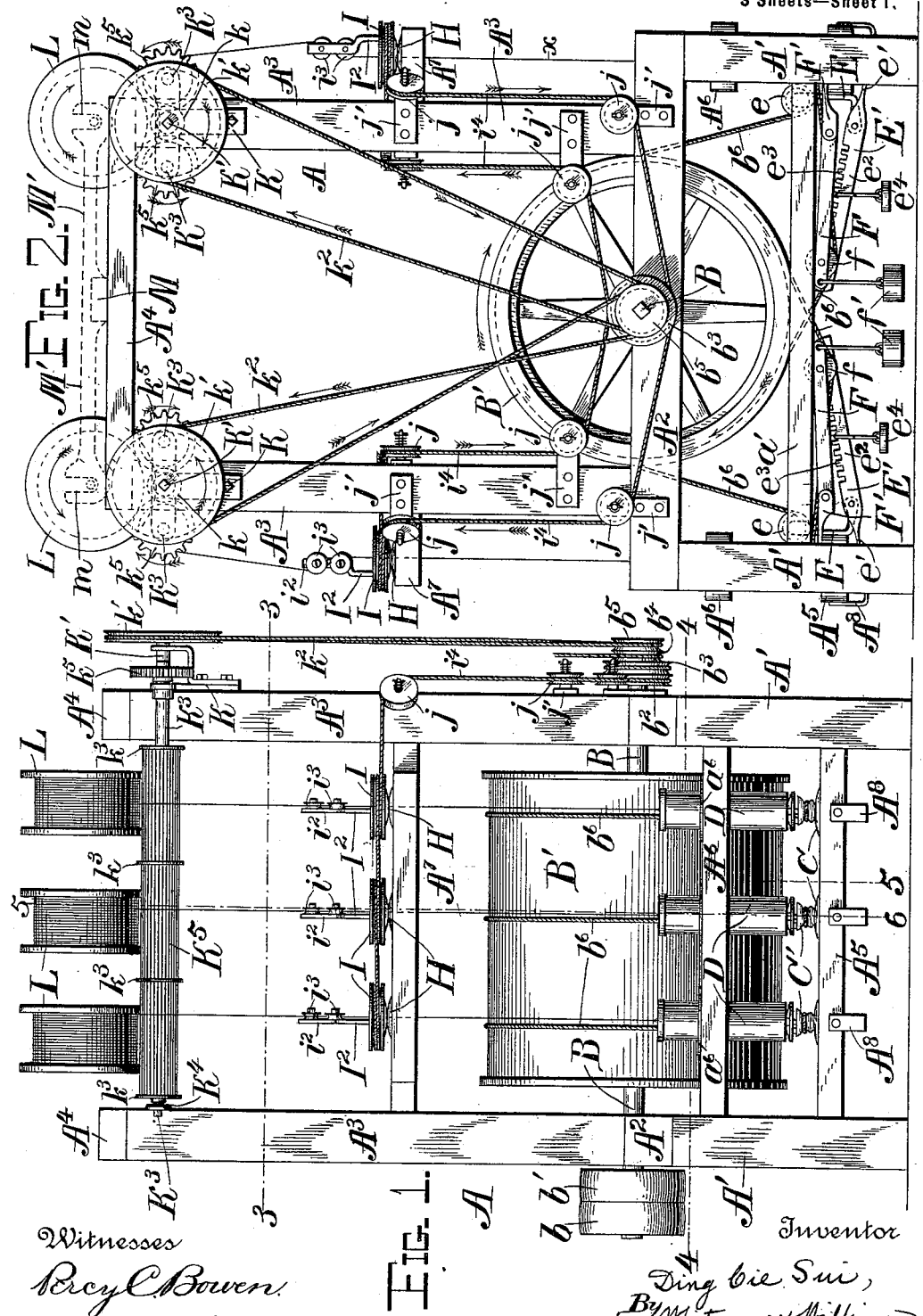
Witnesses
Percy C. Bowen
J. Stephen Giusta
Inventor
Ding Cie Sui,
By Whitman & Wilkinson
Attorneys

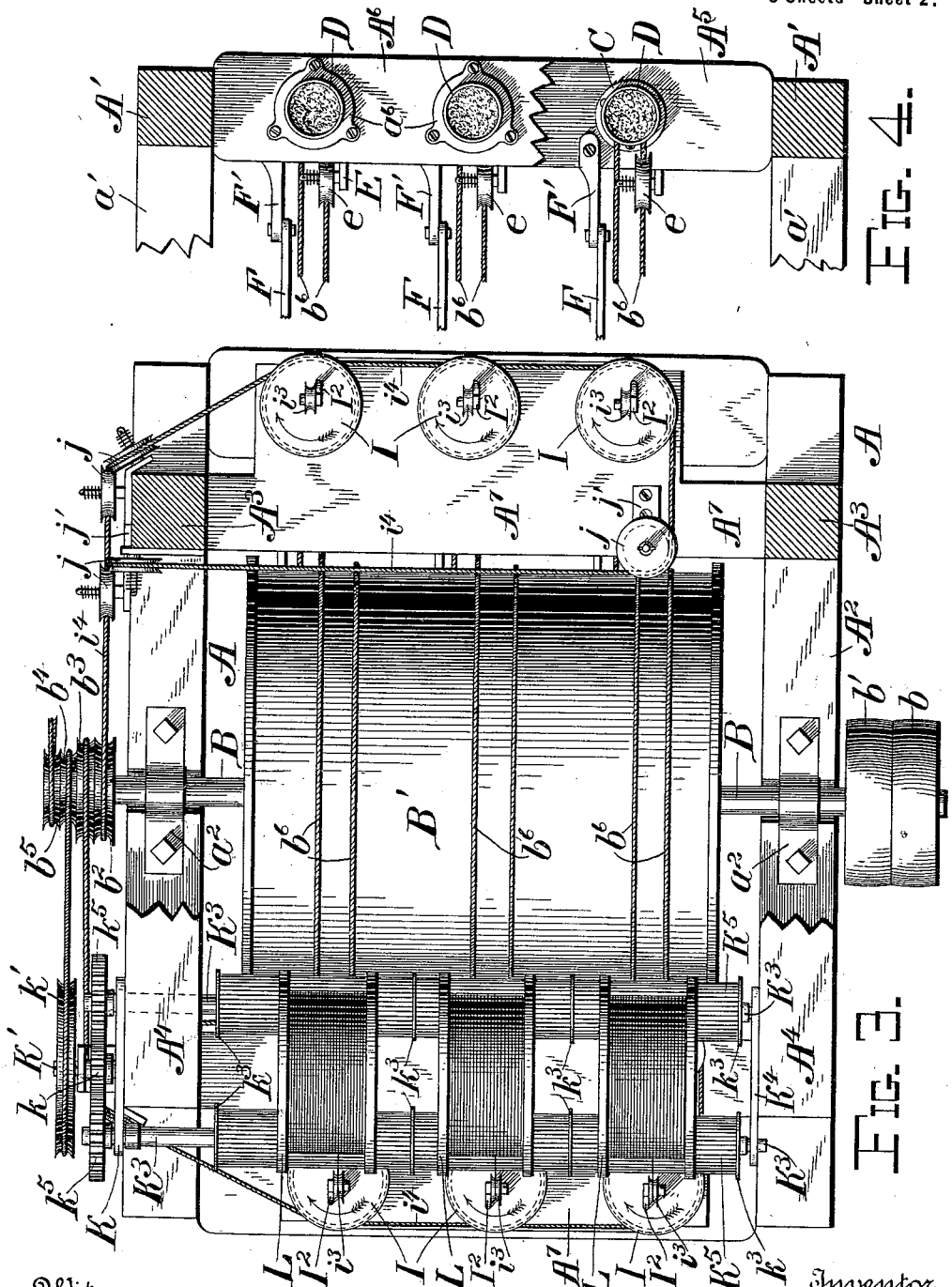

No. 626,195. Patented May 30, 1899.
D. C. SUI.
MACHINE FOR AND PROCESS OF SPINNING.
(Application filed June 18, 1897. Renewed Oct. 8, 1898.)
(No Model.) 3 Sheets—Sheet 3.
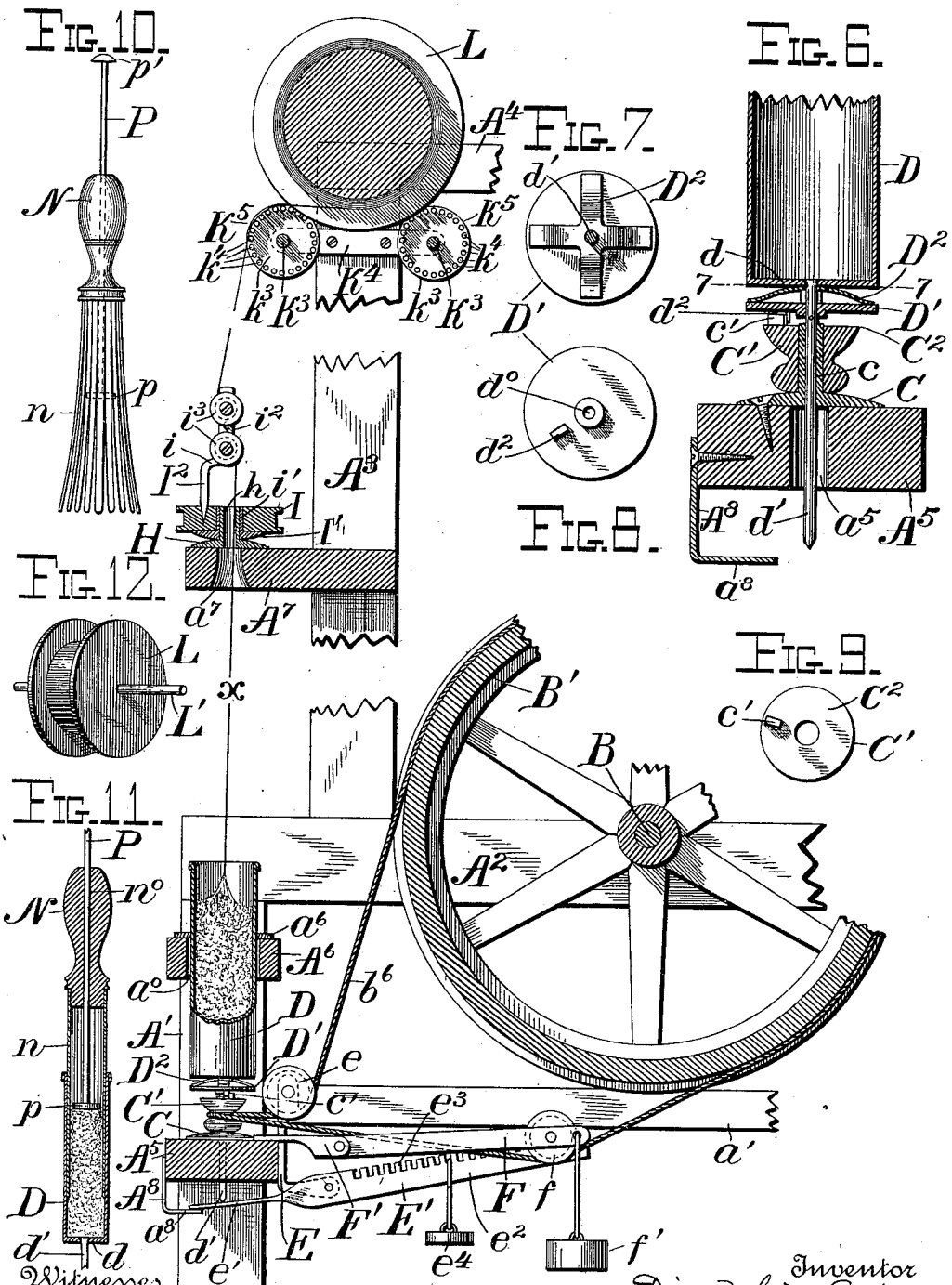

UNITED STATES PATENT OFFICE.

DING CIE SUI, OF FOO CHOW, CHINA, ASSIGNOR TO GEORGE S. MINER AND WILLIAM N. BREWSTER, OF SAME PLACE.

MACHINE FOR AND PROCESS OF SPINNING.

SPECIFICATION forming part of Letters Patent No. 626,195, dated May 30, 1899.

Application filed June 18, 1897. Renewed October 8, 1898. Serial No. 693,046. (No model.)

*To all whom it may concern:*

Be it known that I, DING CIE SUI, a subject of the Emperor of China, residing at Foo Chow, in the Empire of China, have invented certain new and useful Improvements in Machines for and Processes of Spinning; and I do hereby declare the following to be a full, clear, and exact description of the invention, such as will enable others skilled in the art to which it appertains to make and use the same.

My invention relates to spinning-machines and the art of spinning; and it consists of the novel method of spinning, and in the construction and combination of parts, which will be hereinafter fully described and claimed.

Referring to the accompanying drawings, in which the same parts are indicated by the same letters of reference throughout the several views, Figure 1 represents a front elevation of my improved spinning-machine, showing the front half only, the rear part being omitted for the sake of clearness in illustration. Fig. 2 represents a side elevation of the same, looking at the right-hand side of the machine as seen in Fig. 1. Fig. 3 is a plan view of the machine, one-half being shown in horizontal section on the line 3 3 of Fig. 1. Fig. 4 is a horizontal sectional view of one side of the machine, taken on the line 4 4 of Fig. 1 and having a part of the upper beam broken away. Fig. 5 is a vertical sectional view taken on the line 5 5 of Fig. 1, and Fig. 6 is a similar view taken through the lower part of one of the cotton-tubes on the line 5 6 at Fig. 1. Fig. 7 represents a section taken on the line 7 7 of Fig. 6, showing the disk and spring in plan view. Fig. 8 is an inverted view of the disk shown in Fig. 7. Fig. 9 is a plan view of the pulley for imparting motion to the disk shown in Figs. 7 and 8. Fig. 10 represents an elevation of the device for inserting the cotton in the tube. Fig. 11 represents a vertical section of the same inserted in the tube, and Fig. 12 is a perspective view of a modified form of spool for winding the cotton.

The several working parts of the machine are supported between the two end frames A, each of which consists of a pair of short uprights $A'$, connected at their upper ends by a beam $A^2$ and at a point midway of their height by a brace-beam $a'$. Upon the beam $A^2$, a short distance in from the ends, are supported a pair of uprights $A^3$, connected together at their upper ends by a beam $A^4$. These two end frames are connected together at each side of the machine by the parallel beams $A^5$ and $A^6$, connected between the short uprights $A'$, and also by the pieces $A^7$, which form small platforms about midway of the height of the longer uprights $A^3$, to which they are connected at their ends.

A drum $B'$ is mounted on the driving-shaft $B$, which extends longitudinally through the machine and is journaled in boxes $a^2$ on the beams $A^2$. On one end of the driving-shaft $B$ are a pair of fast and loose pulleys $b$ and $b'$, to which power may be applied to drive the machine. It will be obvious that in a small machine designed to be driven by hand a crank-handle might be substituted for the said fast and loose pulleys. The other end of the driving-shaft is provided with two pairs of grooved pulleys $b^2$ $b^3$ and $b^4$ $b^5$, for a purpose to be hereinafter explained. The lower beams $A^5$ are perforated at intervals, as at $a^5$, and disks C, having upright hollow spindles $c$, are secured upon the said beams above the said perforations. Grooved pulleys $C'$ are loosely mounted on the said spindles $c$ and are enlarged at their upper ends to form disks $C^2$, as shown in Figs. 6 and 9. On the flat tops or disks of these pulleys $C'$ are formed lugs $c'$, which impart motion to the cotton-tubes, as will be hereinafter described.

The cotton-tubes D are formed of thin metal open at their upper ends and closed at their lower ends by bottoms $d$. Extending downwardly from the center of the bottoms $d$ are spindles $d'$ of a suitable size to fit loosely in the hollow spindles $c$ of the disks C, through which they pass.

On the spindle $d'$ of each of the cotton-tubes D is arranged a disk $D'$, which is centrally perforated, as at $d^0$, to allow the said spindle to pass through, and the said disk has a lug $d^2$, formed on the lower side thereof, to engage the lug $c'$ of one of the pulleys $C'$ when the spindle $d'$ is placed in the hollow spindle $c$ of the disk C. A cruciform spring $D^2$ is placed on the said spindle $d'$ between the bottom of the tube D and the disk D', so that the bottom of the cotton-tube D will rest upon the raised central portion of the said spring $D^2$, while the ends of the spring rest upon the disk D', and the disk in turn is carried by the pulley C', upon which the lug $d^2$ rests. Thus when the pulleys C' are rotated the lugs $c'$ thereon will impinge against the lugs $d^2$ on the disks D' and rotate the said disks positively, and the springs $D^2$ will be rotated by frictional contact with the said disks D' and will in turn rotate the cotton-tubes D also by frictional contact.

The upper beams $A^6$ are perforated, as at $a^0$, to allow the cotton-tubes D to pass through, and metallic bearing-rings $a^6$ are secured to the top of the said beams above the openings $a^0$ to form supports and bearings for the upper ends of the cotton-tubes, which pass through the said rings and are free to rotate therein.

Motion is imparted to the pulleys C' by bands or cords $b^6$ passing around the drum B' and around the said pulleys and under the guide-pulleys $e$ and $f$. The guide-pulleys $e$ are journaled on brackets E, secured to the beams $A^5$ in the proper position to guide the belt or cord $b^6$ to the pulleys C', and the pulleys $f$ are journaled on levers F, which are pivoted to brackets F' on the bars $A^5$, and have weights $f'$ hung to their ends to keep the belts or cords at the proper tension.

To the lower ends of the brackets E are pivoted levers E', the short arms $e'$ of which extend under the beams $A^5$ and rest against the lower ends of the spindles $d'$, thus carrying the weight of the cotton-tubes. The long arms $e^2$ of the levers E' are provided with teeth $e^3$ along their upper edges, and weights $e^4$ are hung in the said teeth to exert a slight upward pressure on the said spindles, the object of which will be explained hereinafter.

Guards $A^8$ may be secured to the beams $A^5$ and bent under the said beams and ends of the levers E', as at $a^8$, to prevent the said levers from being accidentally displaced and also to prevent cotton or other litter from getting to the ends of the said levers to interfere with the working thereof.

The outer edges of the platforms $A^7$ are perforated, as at $a^7$, above each of the cotton-tubes, and a disk H, having a hollow spindle $h$, is secured above each of the said perforations. A grooved pulley I is mounted on each of the said spindles $h$, and the said pulleys are provided with metal bearing-surfaces I' and bushings $i'$, which fit loosely on the said spindles $h$. An upright $I^2$ is secured to the top of each pulley I and is bent, as at $i$, to bring the upper portion $i^2$ thereof approximately over the hollow spindle $h$. Two small grooved rollers $i^3$ are pivoted to the part $i^2$ of the upright over the opening through the hollow spindle $h$, and the strand of cotton after passing through the said hollow spindle is passed partly around the said rollers $i^3$, as shown in Fig. 5, to give the required tension.

Rotary motion is imparted to the pulleys I by means of the belts or cords $i^4$, which pass from the grooved pulleys $b^2$ and $b^3$ on the driving-shaft B, the belt from the pulley $b^3$ driving the pulleys I on the front of the machine and the belt from the other pulley $b^2$ driving the pulleys I on the back of the machine. These belts $i^4$ are guided to their respective pulleys by the guide-rollers $j$, which are journaled in brackets $j'$, secured to the frame at the proper places, and the said belts are passed once around each of the pulleys I in succession to prevent slipping thereon.

Near the top of the uprights $A^3$ on one end of the frame are secured brackets K, in which are journaled short shafts K', each carrying a pinion $k$ and a grooved pulley $k'$. These two pulleys $k'$ are connected by belts or cords $k^2$ with the pulleys $b^4$ and $b^5$ on the driving-shaft from which they receive motion. The brackets K extend on each side of the uprights $A^3$ and have journaled in their ends shafts $K^3$, which extend longitudinally of the machine and are journaled in a piece $K^4$, secured to the corresponding upright $A^3$ at the other end of the machine. These shafts $K^3$ are provided with disks $k^3$ at suitable intervals, and the said disks are connected together by wires or strips $k^4$, forming wire drums $K^5$. The ends of the shafts $K^3$, projecting through the brackets K, are provided with toothed wheels $k^5$, which mesh with the pinions $k$ on the short shafts K'. Thus the drums $K^5$ are driven from the pulleys $k'$.

The spools L, upon which the strands of cotton are wound, rest upon the two adjacent drums $K^5$, as shown in Figs. 1 and 5 of the drawings, and as the said drums are rotated the spools L will also be rotated to wind up the strand of cotton.

Should it become necessary to provide means to prevent the spools from falling from the drums, a piece M, drawn in dotted lines in Fig. 2, may be secured to the top beams $A^4$ and extend from end to end of the machine, and to this piece M may be secured a suitable number of arms M', also shown in dotted lines in Fig. 2, which extend toward the front and back of the machine and have slots $m$ in their ends in line with the centers of the spools L. In this instance the spools are provided with spindles L', as shown in Fig. 12 of the drawings, which extend into the slots $m$ when the said spools are resting on the drums $K^5$. The spindles L' do not normally touch the sides or ends of the slots $m$, as the weight of the spools should be carried entirely by the drums $K^5$; but should the said spools tilt in either direction the spindles would strike the sides of the slots and prevent the spool from falling.

In Figs. 10 and 11 I have shown a device for placing the cotton in the cotton-tubes, which device consists of a handle N, around one end of which are secured a number of strips $n$ of resilient material, which spread slightly, as shown in Fig. 10. The handle N is perforated longitudinally, as at $n^0$, and a rod P, having a plunger $p$ on the end within the strips $n$ and a knob $p'$ on its outer end, extends and is free to slide through the said perforation $n^0$.

The operation of the invention is as follows: The cotton is placed in the receptacle formed by the strips $n$, the plunger $p$ being pushed back against the handle N, and the ends of the said strips are compressed or bent inwardly and inserted in one of the cotton-tubes D. The device is then pushed into the said tube until the ends of the strips $n$ reach the bottom of the tube, when by pressing upon the knob $p'$ the handle and strips may be withdrawn, leaving the cotton in the tube, or the cotton may be inserted in the tubes in any other convenient way. The tubes after being filled are placed in the machine by inserting through the rings $a^6$ and openings $a^9$ in the beams $A^6$, the spindle $d'$ passing through the hollow spindle $c$ and bearing on the end $e'$ of the lever E', part of the weight of the tube resting upon the spring $D^2$, the disk D', and the pulley C'. A strand of cotton is secured to one of the spools L, (which is placed in position upon the drums $K^5$,) and the said strand is threaded between the rollers $i^3$ and through the hollow spindle $h$, as shown in Fig. 5, and the end of the said strand is placed in the upper end of the cotton-tube. When all of the cotton-tubes have been thus pinned, power is applied to the driving-shaft B to rotate the said shaft, drum, and pulleys connected therewith. The belts or cords $b^6$ will rotate the pulleys C' very rapidly, while the belts $i^4$ from the pulleys $b^2$ and $b^3$ will rotate the pulleys I somewhat slower and the belts $k^2$ and gear-wheels $k'$, $k$, and $k^5$, and the drums $K^5$ will rotate the spools L very slowly. The pulleys C' will rotate the disks D' by means of the lugs $c'$ and $d^2$, and the said disks will rotate the cotton-tubes by frictional contact with the spring $D^2$. As soon as the cotton-tubes D begin to rotate the fibers of the cotton will adhere to the ends of the strands inserted therein and will be twisted into a continuation of the said strands, the spools L meanwhile winding the strands up and drawing the fibers out as they are twisted into the strands. The rotation of the pulleys I and rollers $i^3$ carried thereby will smooth and polish the strands before they are finally wound on the spools L; but these pulleys I and rollers $i^3$ may be omitted, if desired. Should the cotton twist too tightly, the upward pull on the strand would be increased, and, assisted by the weight $e^4$ on the lever E, would tend to raise the cotton-tube D and decrease the friction between the spring $D^2$ and the bottom of the cotton-tube, thus allowing the said spring to slip sufficiently to decrease the speed at which the said tube is rotating, so that the cotton will not be twisted so tightly. By moving the weight $e^4$ along the lever E' the upward pressure on the spindle D' may be varied at will. Thus, for instance, should the weight $e^4$ be moved toward the end of the lever E' the upward pressure on the spindle $d'$ would be increased and the amount of pull on the strand required to raise the cotton-tube and cause slipping at the point of contact with the spring would be decreased. This would result in a larger and loosely-twisted strand. Should the weight $e^4$ be moved near the fulcrum-point of the lever E', the upward pressure on the spindle $d'$ would be decreased and the amount of pull on the strand required to cause slipping at the point of contact of the cotton-tube with the spring would be increased and would result in a small tightly-twisted strand of cotton. Thus by moving the weight $e^4$ along the arm $e^2$ of the lever E' the quality of the strand of cotton may be varied at will.

By the hereinbefore-described construction it will be seen that when a spool is filled it may be lifted off and replaced by an empty spool without stopping or in any way interfering with the working of the other parts of the machine, and also when one of the cotton-tubes becomes empty it may be lifted out, filled, and replaced without in any way interfering with the operation of the other tubes.

Having thus described my invention, what I claim, and desire to secure by Letters Patent of the United States, is—

1. In a machine for spinning fibrous material, the combination with a tubular receptacle for the unspun material; a spindle mounted upon the bottom of said tubular receptacle; a stationary sleeve inclosing said spindle; and a perforated disk fitting over said spindle and supporting said receptacle; of means for rotating said disk; and means for drawing a continuous strand or yarn from said receptacle, substantially as described.

2. In a machine for spinning fibrous material, the combination with a tubular receptacle for the unspun material; a spindle mounted upon the bottom of said tubular receptacle; a stationary sleeve inclosing said spindle; and a perforated disk fitting over said spindle and supporting said tubular receptacle; of a pulley loosely mounted upon said sleeve; connections between said pulley and said disk for rotating the latter; means for rotating said pulley; and means for drawing off a strand or yarn from said receptacle, substantially as described.

3. In a machine for spinning fibrous material, the combination with a tubular receptacle for the unspun material; a spindle mounted upon the bottom of said tubular receptacle; a stationary sleeve inclosing said spindle; a perforated disk fitting over said spindle and supporting said receptacle; and a bent spring interposed between said disk and said receptacle; of means for rotating said disk and said spring therewith; and means for drawing off a continuous strand or yarn from said receptacle, substantially as described.

4. In a machine for spinning fibrous material, the combination with a tubular receptacle for the unspun material; a spindle mounted upon the bottom of said tubular receptacle; a stationary sleeve inclosing said spindle; a perforated disk fitting loosely over said spindle and supporting said tubular receptacle; and a bent spring interposed between said disk and said receptacle; of a pulley loosely mounted upon said sleeve beneath said disk; connections between said pulley and said disk for rotating the latter; means for rotating said pulley; and means for drawing off a strand or yarn from said receptacle, substantially as described.

5. In a machine for spinning fibrous material, the combination with a tubular receptacle for the unspun material; a spindle rigidly mounted upon the bottom of said tubular receptacle; a stationary sleeve inclosing said spindle; a disk mounted loosely upon said spindle above said sleeve; and a cruciform spring loosely interposed between said disk and said receptacle; of means for rotating said disk; and means for drawing a continuous strand or yarn from said receptacle in a direction approximately in line with the axis of rotation of said receptacle, substantially as described.

6. In a machine for spinning fibrous material, the combination with a tubular receptacle for the unspun material; a spindle rigidly mounted upon the bottom of said tubular receptacle; a stationary sleeve inclosing said spindle; a disk loosely mounted upon said spindle above said sleeve; and a cruciform spring loosely mounted upon said spindle between said disk and said receptacle; a pulley loosely mounted upon said sleeve beneath said disk; means for rotating said pulley; and means for drawing a strand or yarn off from said receptacle in a direction approximately in line with the axis of rotation of said receptacle, substantially as described.

7. In a machine for spinning fibrous material, the combination with a tubular receptacle for the unspun material; a spindle mounted upon the bottom of said tubular receptacle; a stationary sleeve for said spindle; and a perforated disk fitting over said spindle and supporting said receptacle; of means for rotating said disk; means for drawing a continuous strand or yarn from said receptacle, and means for regulating the tension on said strand or yarn, substantially as described.

8. In a machine for spinning fibrous material, the combination with a tubular receptacle for unspun material; a spindle mounted upon the bottom of said tubular receptacle; a stationary sleeve inclosing said spindle; and a perforated disk fitting over said spindle and supporting said tubular receptacle; of a pulley loosely surrounding said stationary sleeve beneath said disk; connections between said pulley and said disk for rotating the latter; means for rotating said pulley; means for drawing a strand or yarn from said receptacle, and means for regulating the tension on said strand or yarn, substantially as described.

9. In a machine for spinning fibrous material, the combination with a tubular receptacle for the unspun material; a spindle rigidly mounted upon the bottom of said tubular receptacle; a stationary sleeve inclosing said spindle; a disk mounted loosely upon said spindle above said sleeve; and a cruciform spring loosely interposed between said disk and said receptacle; of means for rotating said disk; and means for drawing a continuous strand or yarn from said receptacle in a direction approximately in line with the axis of rotation of said receptacle, and means for decreasing the amount of friction between said disk and said receptacle, for regulating the tension on said strand or yarn, substantially as described.

10. In a machine for spinning fibrous material, the combination with a tubular receptacle for the unspun material; a spindle rigidly mounted upon the bottom of said tubular receptacle; a stationary sleeve inclosing said spindle; a disk loosely mounted upon said spindle above said sleeve; and a cruciform spring loosely mounted upon said spindle between said disk and said receptacle; of a pulley loosely mounted upon said sleeve beneath said disk; means for rotating said pulley; means for drawing a strand or yarn off from said receptacle in a direction approximately in line with the axis of rotation of said receptacle, and means for decreasing the amount of friction between said disk and said receptacle, for regulating the tension on said strand or yarn, substantially as described.

11. In a machine for spinning fibrous material, the combination with a tubular receptacle for the unspun material, and a pivoted support for said receptacle; of means for rotating said pivoted support; a pair of elevated drums, and means for driving said drums in the same direction; and a spool resting upon said drums and rotated thereby, for winding a continuous strand or yarn from said receptacle, substantially as described.

12. In a machine for spinning fibrous material, the combination with a tubular receptacle for the unspun material, and a pivoted support for said receptacle; of means for rotating said pivoted support; a pair of elevated drums; means for driving said drums in the same direction; a spool resting upon said drums and rotated thereby for winding a continuous strand or yarn from said receptacle; and a pair of pulleys mounted upon a rotating support, adapted to smooth the said strand or yarn as it is being wound, substantially as described.

13. The herein-described improvement in the art of spinning fibrous material, which consists in directly forming from a mass of the raw material, a thread or yarn by twisting the fiber directly from said raw material and simultaneously drawing the same, the drawing action being constant and the twisting action being intermittent, during the operation, substantially as described.

14. The herein-described improvement in the art of spinning fibrous material, which consists in directly forming from a mass of the raw material, a thread or yarn by twisting the fibers directly from said raw material and simultaneously drawing the same, the drawing action being constant and the twisting action varying according to the tension upon the thread or yarn as it is formed, substantially as described.

In testimony whereof I affix my signature in presence of two witnesses.

DING CIE SUI. [L. S.]

Witnesses:
G. S. MINER,
K. H. LAU.